2,900,428
HYDROCARBON SEPARATION BY COMPLEX FORMATION WITH PYROMELLITIC DIANHYDRIDE

Charles D. Heaton and William G. Toland, Jr., San Rafael, Calif., assignors to California Research Corporation, San Francisco, Calif., a corporation of Delaware No Drawing. Application June 20, 1958
Serial No. 743,486

7 Claims. (Cl. 260—674)

This invention relates to the recovery of aryl hydrocarbon compounds from hydrocarbon mixtures containing said compounds.

According to the present invention, compounds in the group consisting of benzene and/or mononuclear aromatic hydrocarbons having only methyl substituents are recovered from mixtures containing at least one of said compounds by a process which comprises contacting in at least one contacting stage said mixture with pyromellitic dianhydride to form a liquid phase and a solid phase, the latter comprising at least one complex of said compounds and pyromellitic dianhydride. The phases are then separated and a product of at least one of said compounds is recovered from the solid phase.

It has been found that benzene and mononuclear aromatic hydrocarbons having only methyl substituents, either alone or in diverse mixtures, complex with pyromellitic dianhydride whereas other alkyl substituted aromatic hydrocarbons do not. The following table shows whether complexing occurred when the noted compounds were contacted with pyromellitic dianhydride at 77° F.

TABLE

| Compound: | Complex |
|---|---|
| Orthoxylene | Yes |
| Paraxylene | Yes |
| Metaxylene | Yes |
| Benzene | Yes |
| Toluene | Yes |
| Mesitylene | Yes |
| Pseudocumene | Yes |
| Durene | Yes |
| Ethylbenzene | No |
| Orthoethyl toluene | No |
| Paraethyl toluene | No |
| Orthodiethylbenzene | No |
| Paradiethylbenzene | No |
| Metadiethylbenzene | No |
| Diisopropylbenzene | No |
| Chlorobenzene | No |
| Orthodichlorobenzene | No |

When solid pyromellitic dianhydride is mixed with either benzene or mononuclear aromatic hydrocarbons having only methyl substituents, the solid visibly increases in volume, generally changes color from white to yellow and gains more weight than is possible by mechanical wetting of the pyromellitic dianhydride crystals. The extra weight gain amounts to approximately 1 mol of aryl hydrocarbon per mol of pyromellitic dianhydride. It is believed that these complexes are $\pi$ complexes, i.e., that they are caused by combination between the $\pi$ electrons of the two benzene rings involved. The pyromellitic dianhydride apparently accepts a share in the $\pi$ electrons of the aryl compound which is complexed with it. Steric factors appear to have a strong effect, since according to the theory of $\pi$ complex formation, the two benzene rings must be close together and parallel in order for the complex to form. These complexes are distinct from the acid-base type as exemplified by complexes of $HF \cdot BF_3$ and xylenes and also from clathrate complexes of, for example, the urea-paraffin type.

The complexes formed by the process of the present invention are, as would be expected, concentration dependent. That is, there is a limiting concentration below which complex formation does not occur. For a given set of conditions there is a specific limit for each complexible material. Thus, for example, in the case of a mixture consisting of orthoxylene and ethylbenzene, all othoxylene will be complexed with pyromellitic dianhydride at 77° F. until the concentration of orthoxylene in the liquid phase reached 17 mol percent. Limits for any complexible material under any particular set of conditions can readily be determined by simple experimentation.

Complexing occurs over a relatively wide temperature range with the rate of complex formation increasing with increasing temperature. For example, in the paraxylene-ethylbenzene binary mixture, complexing takes about four days at —20° F; whereas, the same mixture complexes in about one hour at 77° F. However, with decreasing temperature the limiting concentration of the complexible material decreases. Thus, it has been experimentally found that in the binary mixture of orthoxylene and ethylbenzene the limiting concentration of orthoxylene changes from 24 mol percent at 104° F. to 17 mol percent at 77° F. and to 6 mol percent at —20° F. From the foregoing discussion, it can be seen that the low temperature limits for the process of the present invention are dictated by practical considerations regarding rate of complex formation. The upper temperature limits of the process are governed by the thermal stability of the given complex. Thus it is apparent that the optimum temperature for the operation of the present process depends upon both rate of complex formation and stability factors. In general, the temperatures employed will fall in the range from about —50° F. to 150° F.

It has also been found that as to the compounds that complex with pyromellitic dianhydride, some complex more strongly than others. For example, of the xylenes, the strength of their complexes was found to be (in decreasing order) orthoxylene, paraxylene, and metaxylene. Both benzene and toluene rapidly formed complexes, as did mesitylene and pseudocumene, with the latter being slightly stronger than mesitylene on a competitive basis but less strong than orthoxylene. Durene complexes more strongly than any other compound tested. Of course, the relative strength of any particular compound or compounds that complex with pyromellitic dianhydride can readily be determined by simple experimentation.

The feed to the present process can include, in addition to at least one compound of the benzene and mononuclear aromatic hydrocarbons, other compounds that do not alter, or destroy, the structure of the complex. In general, appreciable quantities of such undesirable compounds as those that will react with an anhydride group are to be avoided. Compounds such as paraffins and the like were found to be essentially inert and had virtually no effect upon the complex formation.

Since complexing occurs on an equimolar basis, the number of mols of pyromellitic dianhydride employed in the complexing step can vary over a wide range, depending upon the degree of recovery desired. Furthermore, the process of the present invention can be conducted in one or a plurality of distinct contacting stages.

An important feature of the present invention lies in the fact that the solid complex is an essentially pure 1:1 complex that is wetted with filtrate. This wet cake can be resolved into (1) a liquid fraction having a concentration essentially the same as the filtrate, (2) an essentially pure pyromellitic dianhydride fraction, and (3) a product fraction having a purity of above about 90 percent.

The aryl compounds can easily be separated from the complex by heating the latter under vacuum and recovering the aryl compounds as a distillate. By employing such a preferred operation, the pyromellitic dianhydride is regenerated and can be reused for further complexing. In fact, it has been found that if previously complexed and regenerated pyromellitic dianhydride is employed for additional complex formation, the rate of such further complexing is much faster than fresh pyromellitic dianhydride. Recovery of the complexed aromatic hydrocarbons can also be done by elution of the complex with an inert solvent or destruction of the anhydride by such agents as water, a strong base, or the like.

A number of compounds related to pyromellitic dianhydride were tested by contacting them with a 70/30 mol mixture of paraxylene/ethylbenzene. Pyromellitic acid, dimethylpyromellitate, tetramethylpyromellitate, pyromellitic diamide and bisthiopyromellitic dianhydride all failed to form a complex with paraxylene.

The following example illustrates the process of the present invention:

Example 1

10 grams (0.0458 mol) of solid pyromellitic dianhydride were mixed with 20 ml. (17.3 grams, 0.163 mol) of a 50/50 mixture of paraxylene and ethylbenzene and kept at 77° F. Initially, the mixture consisted of a white solid covered by a colorless liquid. In approximately two minutes the mixture started to turn yellow; and with intermittent stirring over the next hour, the color intensified to a bright yellow and the solid expanded and changed form until the entire mixture was a heavy slurry. The slurry was allowed to stand for about 16 hours and was then filtered. The wet cake weighed 18.5 grams and the filtrate weighed 7.5 grams. Mechanical losses amounted to 1.3 grams, probably due to evaporation of paraxylene and ethylbenzene during filtration. The filtrate was freed of dissolved pyromellitic dianhydride and complex by extraction with a 5 percent sodium hydroxide solution. It was then water washed, dried over anhydrous magnesium sulfate, and analyzed by standard ultraviolet absorption spectra procedure. It was found to contain 33 percent paraxylene and 67 percent ethylbenzene. Therefore, 4.38 grams (0.0412 mol) of paraxylene were removed by complexing. Division of this molar amount of paraxylene by the 0.0458 mol of pyromellitic dianhydride employed in the initial contact results in a 90 percent efficiency in forming a 1:1 complex between the paraxylene and pyromellitic dianhydride. As used herein, the efficiency represents the percent of xylene (or other complexible material) removed from the initial hydrocarbon mixture of that possible by a 1:1 complex with the amount of pyromellitic dianhydride employed.

Example 2

The procedure of Example 1 was carried out employing a feed mixture of 72 percent paraxylene and 28 percent metaxylene, both complexible materials. The recovered wet solid complex weighed 17.7 grams and the filtrate weighed 8.4 grams. Mechanical losses amounted to 1.2 grams. The filtrate contained 62 percent paraxylene and 38 percent metaxylene. Therefore, 4.57 grams (0.0430 mol) of paraxylene were removed by complexing. Division of this molar amount by the 0.0458 mol of pyromellitic dianhydride employed resulted in a 94 percent efficiency.

The recovered filtrate (62 percent paraxylene and 38 percent metaxylene) was subjected to complexing by the same procedure. The wet cake weighed 18.3 grams and the second filtrate weighed 8.2 grams. Mechanical losses were 0.8 gram. The second filtrate contained 49 percent paraxylene and 51 percent metaxylene. Thus, 4.40 grams (0.0414 mol) of paraxylene complexed with the 0.0458 mol of pyromellitic dianhydride. The efficiency of this second stage complexing was thus 90 percent.

From the above Example 2, it can be seen that the process of the present invention can be conducted in a plurality of stages.

Example 3

The procedure of Example 1 was repeated except that a mixture consisting of 50 percent orthoxylene and 50 percent ethylbenzene was employed as the feed. The wet cake weighed 16.7 grams and the filtrate weighed 9.0 grams. The filtrate contained 37 percent orthoxylene and 63 percent ethylbenzene. The cake was heated under a pressure of 20 mm. and three distillate fractions were collected from the complex as it decomposed. No column was employed, hence no fractional distillation occurred. The results are shown in the following Table 1.

TABLE 1

| Cut No. | Weight, grams | Orthoxylene content, percent | Orthoxylene content, grams |
|---|---|---|---|
| 1 | 2.7 | 52 | 1.4 |
| 2 | 1.2 | 63 | 0.8 |
| 3 | 1.8 | 91 | 1.6 |
| Total | 5.7 |  | 3.8 |

Approximately 10 grams of essentially pure pyromellitic dianhydride were recovered following distillation. Mechanical losses amounted to about 1 gram.

We claim:

1. A method of recovering at least one aromatic compound selected from the group consisting of benzene and mononuclear aromatic hydrocarbons having only methyl substituents from a mixture containing at least one of said aromatic compounds which comprises contacting in at least one contacting stage said mixture with pyromellitic dianhydride to form a liquid phase and a solid phase comprising at least one complex of said compounds and pyromellitic dianhydride, separating said phases, and recovering a product of at least one of said compounds from said solid phase.

2. The method of claim 1 wherein the aromatic compounds are selected from the group consisting of the isomeric xylenes.

3. The method of claim 1 wherein the pyromellitic dianhydride is contacted with the mixture at a temperature of from about −50° to about 150° F.

4. The method of claim 1 wherein the aromatic compounds are selected from the group consisting of the isomeric xylenes and wherein the mixture contains ethylbenzene in addition to at least one of said isomeric xylenes.

5. The method of claim 1 wherein the aromatic compound is toluene.

6. The method of claim 1 wherein the aromatic compound is mesitylene.

7. The method of claim 1 wherein the aromatic compound is durene.

References Cited in the file of this patent

UNITED STATES PATENTS

| | | |
|---|---|---|
| 2,380,561 | Wadsworth | July 31, 1945 |
| 2,578,326 | Toland | Dec. 11, 1951 |
| 2,652,436 | Hess et al. | Sept. 15, 1953 |